United States Patent Office 3,100,814
Patented Aug. 13, 1963

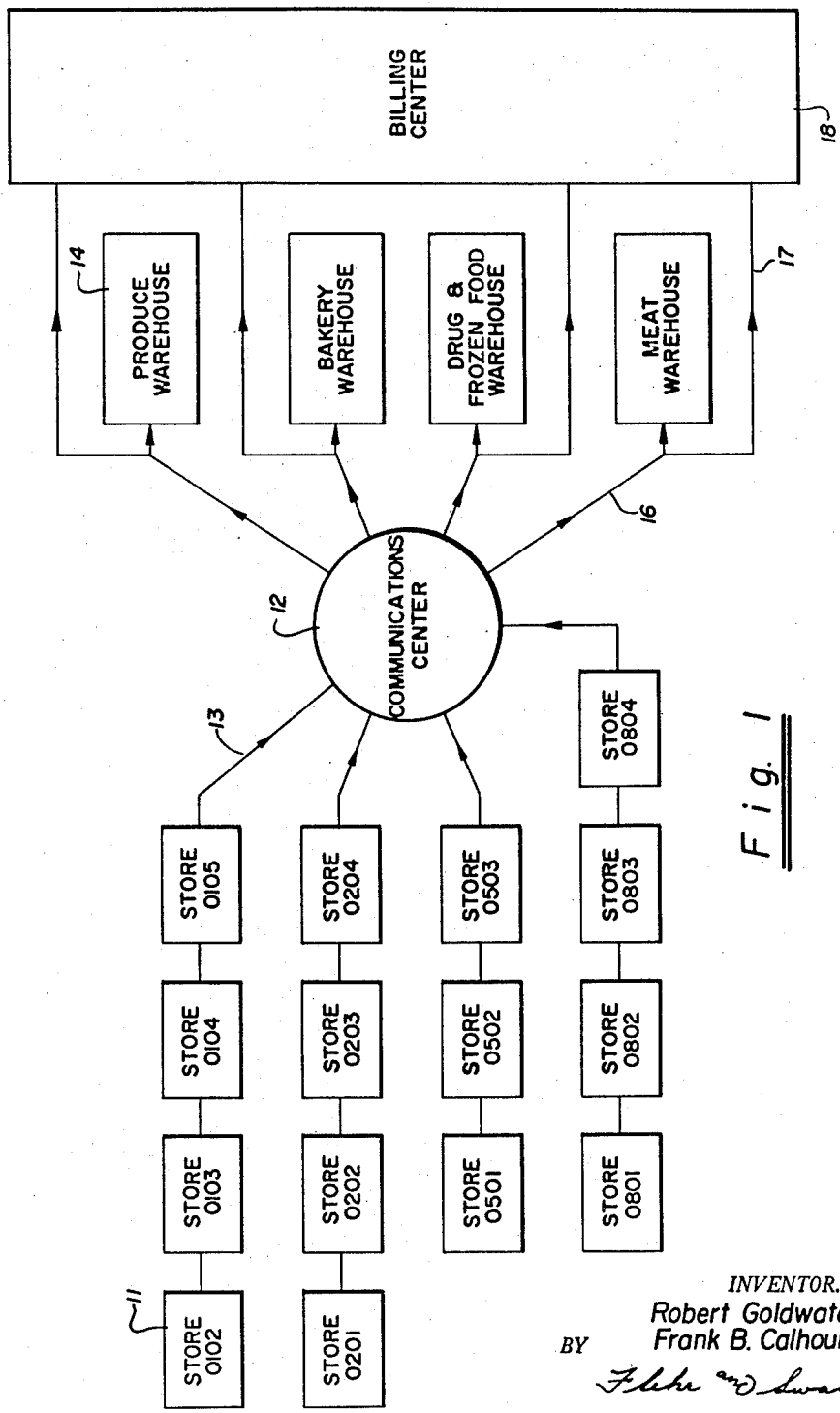

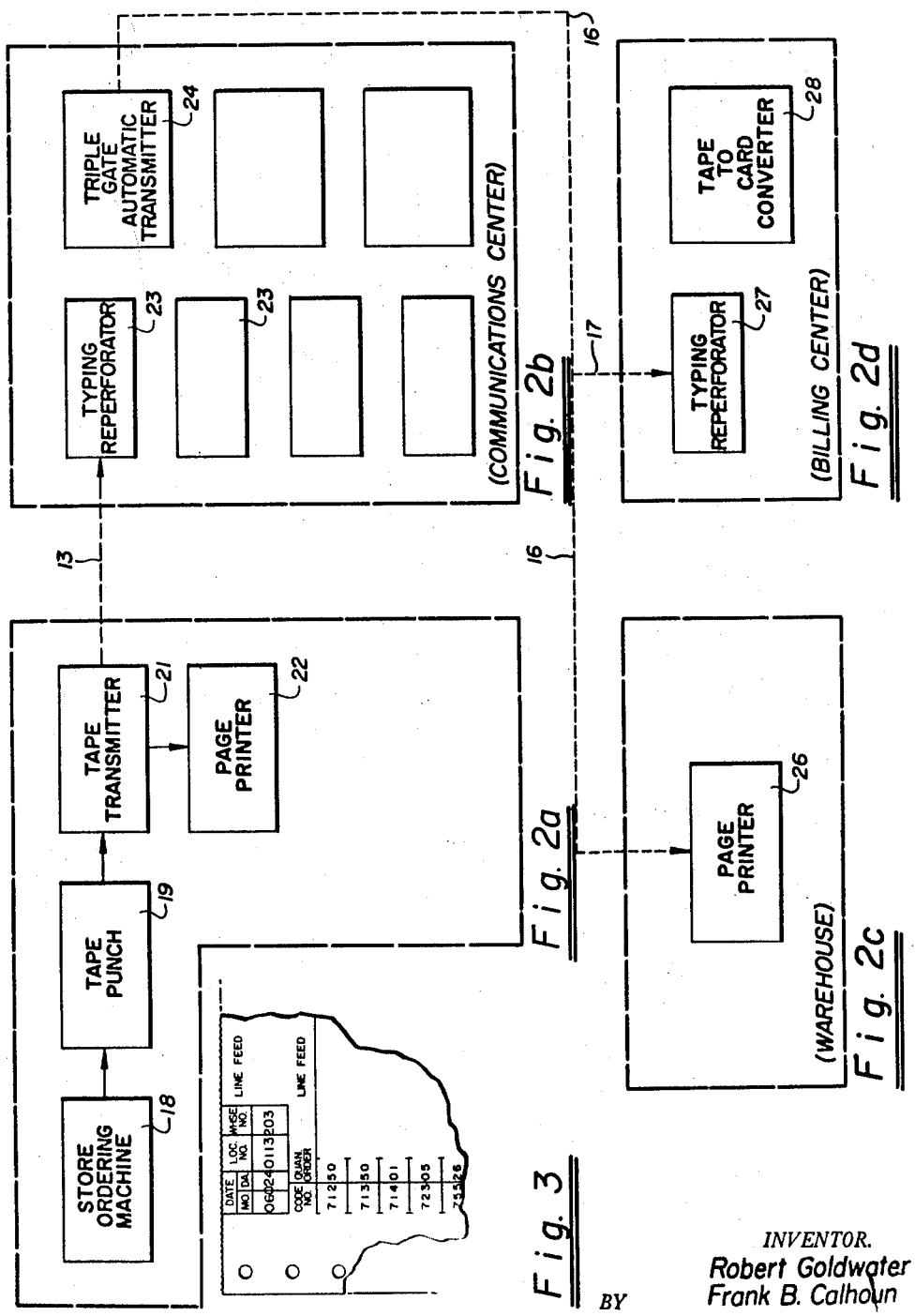

3,100,814
STORE ORDERING SYSTEM AND APPARATUS
Robert Goldwater, Oakland, and Frank B. Calhoun, Fremont, Calif., assignors to Safeway Stores, Incorporated, Oakland, Calif., a corporation of Maryland
Original application Apr. 19, 1957, Ser. No. 653,898, now Patent No. 2,980,758, dated Apr. 18, 1961. Divided and this application Feb. 20, 1961, Ser. No. 90,507
2 Claims. (Cl. 178—3)

The present application is a division of our copending parent application Serial No. 653,898, filed April 19, 1957, now Patent No. 2,980,758, issued April 18, 1961.

This invention relates generally to a store ordering system and apparatus.

In far-flung store chains such as grocery store chains, it is often desirable to provide means whereby the stores can rapidly order merchandise from widely separated warehouses or areas. Where perishable foods such as fruit and vegetables are concerned, it is also desirable to expedite movement of the perishables to the stores as rapidly as possible. At the same time the orders are being placed by the stores, it is desirable to provide billing information to facilitate the keeping of accounting records. Systems and apparatus provided for such purposes must not be unduly expensive. They also must be easy to operate to facilitate rapid ordering with the least possible opportunity for operator error. Insofar as we are aware, no system or apparatus is available which fulfills these requirements.

In general, it is an object of the present invention to provide a store ordering system and apparatus which facilitates rapid ordering of merchandise with little opportunity for error.

Another object of the invention is to provide a system and apparatus of the above character which at the same time provides billing information.

Another object of the invention is to provide a system and apparatus of the above character which operates in conjunction with a conventional five channel paper tape.

Additional objects and features of the invention will appear from the following description in which the preferred embodiment has been set forth in detail in conjunction with the accompanying drawing.

Referring to the drawings:

FIGURE 1 is a block diagram showing a typical store ordering system.

FIGURE 2A shows in block diagram form the equipment located in a typical store.

FIGURES 2B, 2C and 2D show in block diagram form the apparatus utilized in conventional communication centers, warehouses and billing centers respectively.

FIGURE 3 shows a portion of a typed order.

The store ordering system shown in FIGURE 1 of the drawing consists of a plurality of stores 11 connected to a communications center 12 by suitable electric circuit means such as the lines 13. As shown, one or more stores can be connected to the same line because each store does not need continuous use of a line for reasons hereinafter apparent. The communication center 12 is connected to a plurality of warehouses 14 by suitable electrical circuit means such as lines 16. The lines 16 leading to the warehouses are connected by lines 17 to a billing center 18.

Suitable apparatus is provided in each of the stores, in the communication center, in the billing center and in the warehouses, as shown in FIGURES 2A, 2B, 2C and 2D. Thus, the apparatus in each of the stores can consist of a store ordering machine described in our copending parent application Serial No. 653,898, filed April 19, 1957.

The tape punch can be of any suitable type for producing five channel paper tape such as the model No. 2 motorized tape punch manufactured by Commercial Controls Corp. of Rochester, New York. The tape transmitter can also be of any suitable type adapted to receive five channel paper tape such as the model No. 14 manufactured by the Teletype Corp. The page printer may be of any suitable type which is adapted to produce a printed copy of the information sent through the tape transmitter such as the model No. 15 manufactured by Teletype Corp.

As is well known to those skilled in the art, the tape transmitter produces a series of pulses in the form of marks and spaces which can be transmitted over electrical circuit means as in this case the lines 13 to the communication center 12. Each of the lines coming into the communication center are connected to a typing reperforator 23 and also may be of any suitable type such as one manufactured by Teletype Corp. The typing reperforator as is well known to those skilled in the art produces a five channel paper tape from the information received on the line 13.

As soon as the five channel tapes are produced, the tapes are separated into strips for the various warehouses. The tapes are then fed into the automatic transmitters 24 and the information on the tape is sent in the form of marks and spaces over the lines 16 to the respective warehouses. The pulses are received by a page printer 26 such as the model No. 15 manufactured by the Teletype Corp. which is located at the warehouse. A suitable printed record is produced by the page printer such as a three part form hereinafter described.

The same information which is received by the warehouses is also sent to the billing center and is received on a typing reperforator 27 of the same type as utilized in the communication center which produces an interpreted five channel tape from the information received. The interpreted tapes are then run through a tape-to-card converter 28 to create cards for each store order. The tape-to-card converter can be of any suitable type well known to those skilled in the art such as one which utilized IBM cards.

As described in our copending parent application Serial No. 653,898, filed April 19, 1957, the store ordering machine disclosed therein is utilized for placing the order and a tape is produced by the tape punch 19 to produce a conventional five channel tape. After the order is completed, the tape is torn off and inserted into the tape transmitter 21.

The tape transmitter 21 as is well known to those skilled in the art, generates a plurality of pulses in the form of marks and spaces which are sent over the electrical circuit 13 to the typing reperforator 23 at the communications center. At the same time a page copy is produced at the store by the page printer 22.

The typing reperforator at the communications center produces a tape similar to that inserted in the tape transmitter 21 except that it is chadless and interpreted as is well known to those skilled in the art. The five channel tapes produced by all of the typing reperforators at the communications center are torn into separate sections so that each section contains only orders for a single warehouse. All of the tapes for one warehouse are fed through the automatic transmitter 24 connected to the warehouse for which the orders on the tapes are intended.

The automatic transmitter sends a plurality of pulses in the form of marks and spaces to the selected warehouse where the marks and spaces are received by the page printer 26 to produce multiple copies of the order. An example of the type of order which is produced by the page printer 26 is shown in FIGURE 3. From this figure it can be seen that the month of the year, the day of the month, the store number, the price group and the warehouse number are printed on one line. The first two numbers of the heading designate the month of the year, the second two numbers designate the day of the month, the second four numbers designate the store number, the next number designates the price group and the last two numbers designate the warehouse number.

The page printer then receives a carriage return and two line feeds to put it in position to receive the first typing line. On each line is printed the page number from which the commodity is selected, the code number of the selected commodity and the quantity ordered. As for example, as shown in FIGURE 3, the first number designates the page number selected, the second two numbers designate the code number of the commodity selected and the last two numbers designate the quantity ordered.

As many copies as desired can be produced by the page printer 26. For example, a three copy form can be utilized in which one copy goes to the store with the order when the order is shipped, one copy goes to the accounting or billing department and one copy stays in the warehouse which ships the order.

At the same time that the order is being transmitted to the warehouse, the order is received in a typing reperforator 27 in the billing center. One reperforator is required for each warehouse. The typing reperforator produces an interrupted five channel punched tape as is well known to those skilled in the art. After the order has been completed, the tape is removed from the typing reperforator and fed into the tape-to-card converter 28 which makes up IBM cards for billing, inventory records and accounting uses.

It is apparent from the foregoing that we have provided a novel store ordering system and apparatus which greatly facilitates the ordering of commodities by the stores and shipment of the commodities to the stores. The system and apparatus is particularly advantageous in connection with the ordering and delivery of perishable food. The system will enable buyers for all of the stores to expedite movement of a vast quantity of perishables which daily move through each of the stores. When additional perishables or commodities are required, the store manager need merely prepare the order on the store ordering machine, place the tape in the transmitter and shortly thereafter his order will be on the way. The foods obtained by the store in this manner are much fresher because they are only hours off the refrigerated warehouse floors. If there are sudden changes in the weather which will increase the demand, the orders can be revised upwardly with very little trouble.

By utilizing such a system, the store managers can place their orders each day within a few minutes which makes possible a tremendous saving of time.

The system used for ordering perishables and other commodities, by addition of very little conventional teletype equipment can be used for transmitting plans, letters, forms and the like to the individual stores. The system can also be utilized for transmitting to the stores all price guide pages and price adjustment forms.

We claim:

1. In a store ordering system, a plurality of stores, a communications center, electrical circuit means connecting each of said stores to said communications center, a plurality of warehouses, electrical circuit means connecting each of said warehouses to said communications center, commodity ordering means in each of said stores for producing an order on a punched tape identifying each commodity ordered and the quantity thereof desired, means in each of said stores for receiving the punched tape and converting the information contained thereon into electrical pulses and transmitting the same over said first named electrical circuit means to the communications center, means at the communications center for receiving the pulses and converting them into a punched tape, means at the communications center for receiving the punched tape and converting the information on the punched tape into electrical pulses, means at the communications center for selecting predetermined warehouses and transmitting the last named electrical pulses over the second named electrical circuit means to selected warehouses, and means at each of the warehouses for receiving the pulses sent to each warehouse and for producing a typed list of the commodities ordered with the quantity desired of each commodity.

2. A store ordering system as in claim 1 wherein said commodity ordering means includes means for generating pulses identifying the store placing the order.

References Cited in the file of this patent
UNITED STATES PATENTS

| | | |
|---|---|---|
| 2,946,843 | Stiles | July 26, 1960 |
| 2,976,347 | Fisher et al. | Mar. 21, 1961 |
| 2,978,534 | Crowson | Apr. 4, 1961 |